(12) United States Patent
Sweat et al.

(10) Patent No.: US 12,230,410 B2
(45) Date of Patent: Feb. 18, 2025

(54) ENERGY STORAGE SYSTEM FOR NUCLEAR REACTOR REMOTE INSTALLATION

(71) Applicant: Westinghouse Electric Company LLC, Cranberry Township, PA (US)

(72) Inventors: Scott M. Sweat, Pittsburgh, PA (US); Ibrahim Ezelarab, Mars, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 3 days.

(21) Appl. No.: 18/158,848

(22) Filed: Jan. 24, 2023

(65) Prior Publication Data

US 2024/0249853 A1 Jul. 25, 2024

(51) Int. Cl.
| | |
|---|---|
| H02J 3/00 | (2006.01) |
| G21D 1/02 | (2006.01) |
| G21D 3/00 | (2006.01) |
| H02J 13/00 | (2006.01) |

(52) U.S. Cl.
CPC .............. *G21D 1/02* (2013.01); *G21D 3/001* (2013.01); *H02J 3/003* (2020.01); *H02J 13/00002* (2020.01)

(58) Field of Classification Search
CPC . G21D 1/02; G21D 3/001; H02J 3/003; H02J 13/00002; H02J 3/46
See application file for complete search history.

(56) References Cited

U.S. PATENT DOCUMENTS

| | | |
|---|---|---|
| 2012/0053750 A1 | 3/2012 | Viassolo et al. |
| 2017/0241353 A1* | 8/2017 | Young ................. F02D 41/0027 |
| 2021/0095645 A1* | 4/2021 | Cheatham, III ........ F01K 3/181 |

FOREIGN PATENT DOCUMENTS

JP 2018513985 A 5/2018

OTHER PUBLICATIONS

International Search Report and Written Opinion for International PCT Application No. PCT/US2024/012801, dated Apr. 29, 2024.

\* cited by examiner

*Primary Examiner* — Lincoln D Donovan
*Assistant Examiner* — Alex W Lam
(74) *Attorney, Agent, or Firm* — K&L Gates LLP

(57) ABSTRACT

Disclosed is a nuclear reactor system for use with a power grid. The nuclear reactor system comprising a nuclear reactor, an energy storage system coupled to the nuclear reactor, and a control circuit coupled to the nuclear reactor and the energy storage system. The control circuit is configured to monitor a power demand of the power grid, monitor a power output generated from the nuclear reactor, detect a change in the power demand, cause the energy storage system to temporarily compensate for the change in the power demand, and adjust the power output based on the change in the power demand.

17 Claims, 5 Drawing Sheets

ENERGY STORAGE SYSTEM FOR NUCLEAR REACTOR REMOTE INSTALLATION

GOVERNMENT CONTRACT

This invention was made with government support under Contract No. DE-NE0009050 awarded by the Department of Energy. The government has certain rights in the invention.

BACKGROUND

The present disclosure relates to nuclear reactors.

SUMMARY

In one general aspect, the present disclosure provides a nuclear reactor system for use with a power grid. The nuclear reactor system comprising a nuclear reactor, an energy storage system coupled to the nuclear reactor, and a control circuit coupled to the nuclear reactor and the energy storage system. The control circuit is configured to: monitor a power demand of the power grid, monitor a power output generated from the nuclear reactor, detect a change in the power demand, cause the energy storage system to temporarily compensate for the change in the power demand, and adjust the power output based on the change in the power demand.

In another aspect, the present disclosure provides a method of performing load following of a power grid with a nuclear reactor system. The method comprising monitoring a power demand of the power grid, monitoring a power output generated from a nuclear reactor, detecting a change in the power demand, causing an energy storage system to temporarily compensate for the new power demand, and adjusting the power output based on the change in the power demand.

In another aspect, the present disclosure provides a nuclear reactor system for use with a power grid. The nuclear reactor system comprising a nuclear reactor and a power conversion system coupled to the nuclear reactor, wherein the power conversion system transforms a thermal output from the nuclear reactor into electricity. The nuclear reactor system further comprises an energy storage system coupled to the power conversion system and a control circuit coupled to the power conversion system, the nuclear reactor, and the energy storage system. The control circuit is configured to monitor a load on the power grid, monitor a power output generated by the nuclear reactor through the power conversion system and supplied to the power grid, and detect a new load on the power grid, wherein the new load is different than the power output. The control circuit is further configured to cause the energy storage system to temporarily compensate for the new load, and adjust the nuclear reactor to generate a new power output based on the new load.

BRIEF DESCRIPTION OF THE FIGURES

The novel features of the various aspects are set forth with particularity in the appended claims. Throughout the FIGS. like reference characters designate like or corresponding parts throughout the several views of the drawings. The described aspects, however, both as to organization and methods of operation, may be best understood by reference to the following description, taken in conjunction with the accompanying drawings in which:

DESCRIPTION

Figure 1:
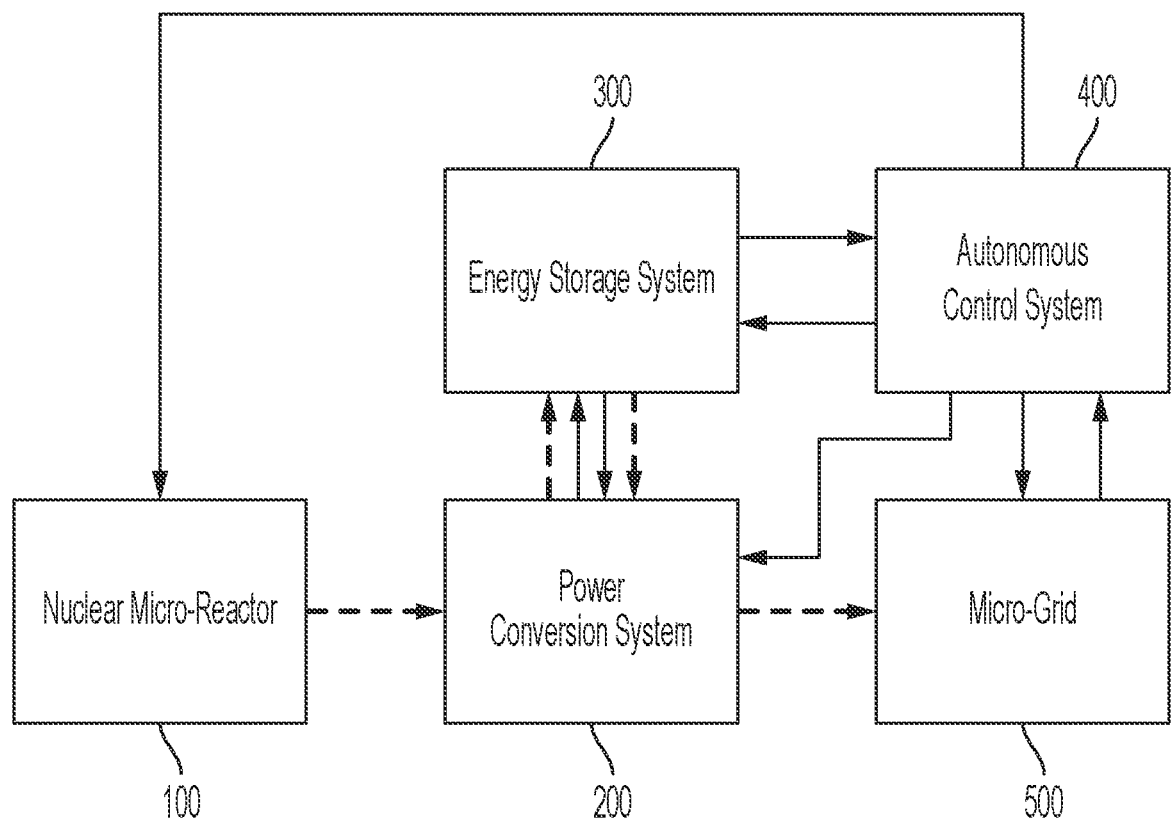
FIG. 1 is a diagram of power generated from a nuclear micro-reactor and supplied to a power grid, according to at least one aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "top", "bottom", "forward", "rearward", "left", "right", "upwardly", "downwardly", and the other such words are words of convenience and are not to be construed as limiting terms.

It should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Micro-reactors offer flexibility and potential to revolutionize how carbon free energy is delivered. Nuclear micro-reactors, e.g. high temperature, heat pipe micro-reactors, are a revolutionary design that can address many challenges standing in the way of carbon-free energy. The nuclear micro-reactors can be designed for safe and reliable electricity and heat generation with a cost competitive lifecycle. However, some micro-reactor designs have an inherent thermal lag that impacts the ramp rate for load changes. Stated another way some micro-reactors cannot quickly change the power output of the micro-reactor based on a desired load. For example, it can take minutes for the micro-reactor to reach a new desired power output. As such, an efficient means of power delivery compensation needs to be developed for these micro-reactors to perform load following, where load following is the micro-reactor system supplying a desired load instantly, on the order of microseconds, to a user.

One solution is to add an energy storage system to the micro-reactor system to compensate for the thermal lag and allow the micro-reactor system to provide load follow functionality. The energy storage system allows the micro-reactor system to provide power seamlessly while the power output of the micro-reactor core is changed to meet a new power demand, or load. In at least one aspect, a control circuit controls the energy flow into and out of the energy storage system during load changes and maintains the charge level of the storage system to accommodate any load changes.

An energy storage system provides many benefits to the micro-reactor system. For example, the energy storage system can tie in directly with a power conversion system of the micro-reactor system such that minimal additional space is required for the energy storage system. In some aspects, the addition of the energy storage system allows for more space since some electrical connection equipment and power generation equipment can be removed. For example, without the energy storage system, other distributed energy resources and/or battery systems would have to be installed on the micro-grid to compensate for customer load changes, which would require additional space and connection equipment. The energy storage system eliminates the need to add power sources to the micro-grid to compensate for the micro-reactor thermal response, which reduces the need for additional grid connection points, transformers, switchgear, relaying, etc. In at least one aspect, the energy storage system is a battery storage system and any additional space can be used to house additional battery cells. The additional battery cells can form additional banks which can be removed from service or switched to replace defective banks or to facilitate maintenance.

The battery energy storage system is unlike other grid level energy storage systems in that it serves as a "buffer" between the grid and the micro-reactor allowing the micro-reactor to achieve the desired power level during gradual or sudden power changes. The energy storage system disclosed is designed to facilitate load follow to compensate for a slow power output change of the micro-reactor. This process makes the energy storage system different than other energy storage systems that are only designed to store energy during periods of excess generation and discharge that energy later in the day.

FIG. 1 is a diagram of power generated from a nuclear micro-reactor 100 and supplied to a micro-grid 500, according to at least one aspect of the present disclosure. While FIG. 1 discusses the nuclear micro-reactor 100 being used to generate power for the micro-grid 500, any size nuclear reactor or any size of power grid could be used as described in regard to FIG. 1. The nuclear micro-reactor 100 generates heat that is used by the power conversion system 200 to generate power that is supplied to the micro-grid 500. The energy storage system 300 can then supply additional power to or receive excess power from the power conversion system 200 based on the difference between the power generated by the power conversion system 200 and the power demand of the micro-grid 500. In at least one aspect, the energy storage system 300 is maintained around 50% energy storage capacity so that it can either receive power from or supply power to the power conversion system 200.

In one aspect, the energy storage system has an energy storage capacity of at least 3.5 MWh. In an alternative aspect, the energy storage system can be configured to have any capacity that allows the energy storage system 300 to receive and supply energy as required to meet the power demands of the micro-grid 500. The energy storage system can be a mechanical energy storage system, a thermal energy storage system, a battery storage system including a plurality of battery cells, super capacitor energy storage system, super conducting magnet energy storage system, or etc. For example, a battery storage system can include sodium-sulfur batteries, sodium-nickel-chloride batteries, lead-acid batteries, lithium-ion stationary batteries, redox flow batteries, vanadium redox flow batteries, iron-chromium redox flow batteries, zinc-bromine redox flow batteries, zinc-air batteries, or etc. For example, a mechanical energy storage system can include a flywheel energy storage system. For example, a super capacitor energy storage system can include high power supercapacitors, high energy supercapacitors, or etc. In at least one aspect, the type of energy storage system and the specifications of that energy storage system are defined based on a user's needs.

The autonomous control system 400 receives data indicative of the power demand of the micro-grid 500. In at least one aspect, the autonomous control system 400 controls the output of the nuclear micro-reactor 100, which controls the power generated by the power conversion system 200, and the autonomous control system 400 controls the energy stored in the energy storage system 300. In at least one aspect, the autonomous control system 400 is communicably coupled to the energy storage system 300, the power conversion system 200, and the nuclear micro-reactor 100. In at least one aspect, the energy storage system 300 is communicably coupled to the power conversion system 200.

Figure 2:
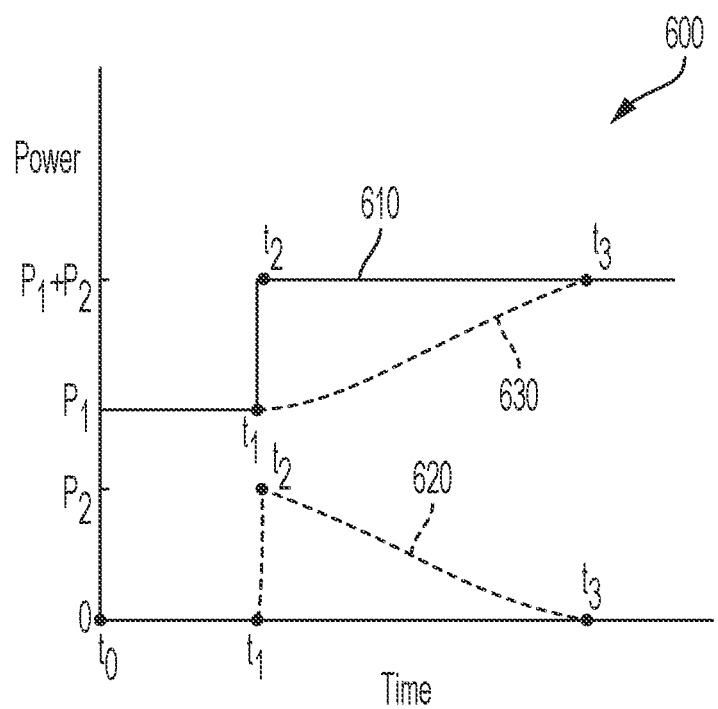
FIG. 2 is a graphical representation of the power flow from the energy storage system and power conversion system to a grid, according to at least one aspect of the present disclosure.

FIG. 2 illustrates how the energy storage system 300 compensates for the power generated 630 by the power conversion system 200 during an increase in power demand 610 of the micro-grid 500. For example, a power demand increase can be caused by a user plugging in a device into the micro-grid 500. During an increase in power demand, the energy storage system supplies additional power to the power conversion system such that the power generated by the power conversion system from the micro-reactor 100 and the power supplied matches the new power demand.

FIG. 2 is a graphical representation 600 of the power flow from the energy storage system 300 and the power conversion system 200 to the micro-grid, according to at least one aspect of the present disclosure. In the graphical representation 600, time $t_0$ occurs before time $t_1$, time $t_1$ occurs before time $t_2$, and time $t_2$ occurs before time $t_3$. Initially at time $t_0$, the power generated 630 by the power conversion system 200 matches the power demand 610 of the micro-grid 500 and the energy storage system 300 does not supply any power. At time $t_1$, the power demand 610 is increased from power level $P_1$ to power level $P_1+P_2$. For example, the autonomous control system 400 receives data indicating an increase in power demand 610 at time $t_1$. The autonomous control system 400 then causes the energy storage system 300 to supply energy to the micro-grid 500 through the power conversion system 200. At time $t_1$, the energy storage system 300 begins supplying power 620 to the micro-grid 500. At time $t_2$, supplied power 620 from the energy storage system 300 reaches $P_2$. As shown in FIG. 2, at time $t_2$, the power generated 630 from the power conversion system is approximately $P_1$ and the power supplied 620 from the energy storage system 300 is approximately $P_2$. As such, the total power supplied to the micro-grid 500 at time $t_2$ is $P_1+P_2$ matching the power demand 610. In one aspect, the time difference between $t_1$ and $t_2$ is on the scale of micro-seconds. In another aspect, the time difference between $t_1$ and $t_2$ is less than a micro-second.

The power generated 630 by the power conversion system 200 increases from time $t_1$ to time $t_3$. At time $t_3$, the power generated 630 by the power conversion system 200 matches the power demand 610 of the micro-grid 500. From time $t_2$ to time $t_3$, the power supplied 620 by the energy storage system 300 decreases by the same amount that the power conversion system 200 increases. This process allows the total power supplied to the micro-grid 500 to be the power demand 610 of $P_1+P_2$ at any time after $t_2$. As such, after time $t_3$, the energy storage system no longer supplies power 620 to the power conversion system 200.

The utilized capacity of the energy storage system 300 is maintained at a threshold range so that at any time the energy storage system 300 can supply or receive energy from the power conversion system. In at least one aspect, the threshold range is centered around 50% utilized capacity of the energy storage system. In one aspect, the threshold range can be 20% of the capacity of the energy storage system. In this aspect, the lower end threshold of the threshold range would be 40% of the total capacity and the upper range threshold of the threshold range would be 60% of the total capacity. In an alternative aspect, the threshold range can be any amount that allows the energy storage system 300 to supply or receive energy from the power conversion system.

Referring to FIG. 2, after the power generated by the power conversion system 200 matches the new increased power demand, the utilized storage capacity could be less than a lower end threshold of the threshold range. In at least one aspect, a control circuit in the autonomous control system 400 can perform a method to maintain the energy storage system 300 within the threshold range. In an alternative aspect, the method of maintaining the energy storage system 300 at the threshold range can be executed by a control circuit in the energy storage system 300 or by a control circuit in the power conversion system 200. The method includes the control circuit detecting that the utilized storage capacity of the energy storage system 300 is below a lower end of the threshold range. In at least one aspect, the lower end of the threshold range is below 50% of the total storage capacity. The method further includes the control circuit increasing the power generated from the nuclear micro-reactor 100, where the excess energy is directed to the energy storage system 300 to increase the utilized capacity of the energy storage system 300. The method further includes the control circuit adjusting the power generated by the power conversion system 200 to match the power demand after the utilized capacity of the energy storage system 300 is above the lower end of the threshold range.

The energy storage system 300 compensates for the power generated by the power conversion system 200 during a decrease in power demand of the micro-grid 500 in a similar manner to that described in regard to FIG. 2. For example, a decrease in power demand can be caused by a user unplugging a device from the micro-grid 500. During a decrease in power demand, the energy storage system receives excess power from the power conversion system. For example, when the power demand decreases, it can take time for the power generated by the power conversion system 200 to decrease to the new power demand, which is similar to how it takes time for the power generated by the power conversion system to increase as shown in FIG. 2 from time $t_1$ to $t_3$. During the time that the power conversion system 200 is decreasing power generation to match the new power demand, the energy storage system 300 receives the excess power generated by the power conversion system 200. As such, the power supplied to the micro-grid 500 during this time matches the new power demand.

After the power generated by the power conversion system 200 matches the new decreased power demand, the utilized storage capacity could be greater than an upper end threshold of the threshold range. In at least one aspect, a control circuit in the autonomous control system 400 can perform a method to maintain the energy storage system 300 within the threshold range. In an alternative aspect, the method of maintaining the energy storage system 300 within the threshold range can be executed by a control circuit in the energy storage system 300 or by a control circuit in the power conversion system 200. The method includes the control circuit detecting that the utilized storage capacity of the energy storage system 300 is greater than the upper end of the threshold range. In at least one aspect, the upper end of the threshold range is above 50% of the total storage capacity. The method further includes the control circuit decreasing the power generated from the nuclear micro-reactor 100, where the additional energy required to meet the power demand is supplied from the energy storage system 300 to decrease the utilized capacity of the energy storage system 300. The method further includes the control circuit adjusting the power generated by the power conversion system 200 to meet the power demand after the utilized capacity of the energy storage system 300 is below the upper end of the threshold range.

In at least one aspect, the energy storage system 300 is configured to supply the energy needed to startup the nuclear micro-reactor 100. For example, the energy storage system 300 could supply power to initiate airflow through a heat exchanger during startup. In at least one aspect, the energy storage system 300 is configured to provide the energy required for shutdown monitoring of the nuclear micro-reactor 100.

A benefit of a nuclear micro-reactor system is that a nuclear micro-reactor facility can be installed over a small footprint, e.g. on a one-acre footprint, without deep excavations. In at least one aspect, the entire facility design can comprise four containers that house the nuclear micro-reactor 100, the power conversion system 200, the autonomous control system 400, and the energy storage system 300. For example, the facility design can rely on a container housing the nuclear micro-reactor 100 and a single set of support containers (instrumentation, control & electrical; power conversion; energy storage for load follow applications, and etc.). In one aspect, the energy storage container houses the energy storage system, an energy management system, fire suppression system, HVAC, and security access equipment. The containers can be transportable via existing infrastructure (road, rail, or sea). In at least one aspect, the facility design further comprises a rapid replacement container that allows for rapid changeover from one used nuclear micro-reactor 100 to a replacement nuclear micro-reactor 100. This rapid replacement container allows a new micro-reactor 100 to be placed and started up, while the old micro-reactor 100 is shut down and cooling for proper disposal.

In one aspect, piping chases are used to connect the nuclear micro-reactor 100 housed in one container with the power conversion system housed in a different container. For multi-unit applications, the containers housing the components of each unit can be replicated identically and installed next to each other, reducing the required footprint per unit.

Figure 4:
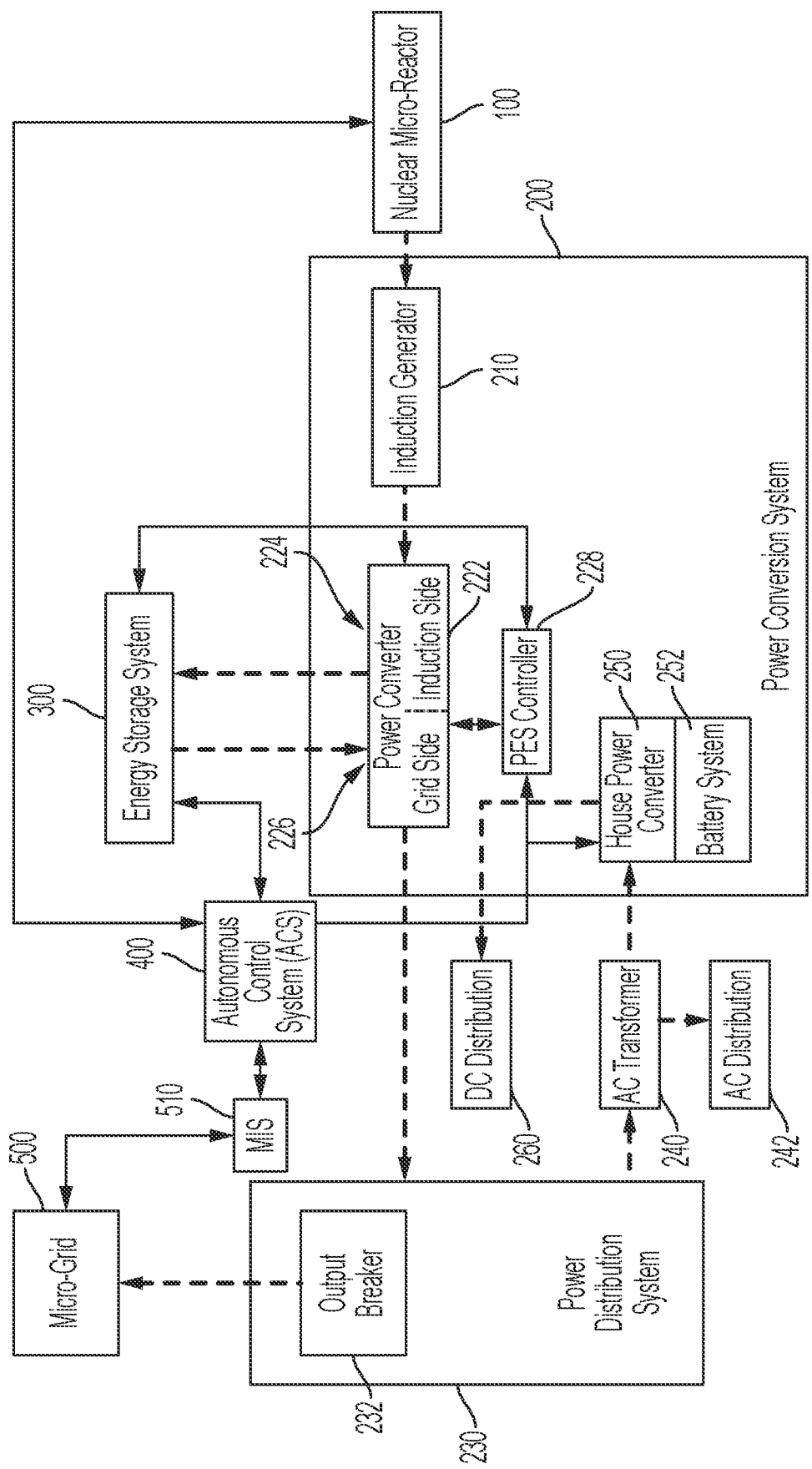
FIG. 4 is a diagram of an example energy flow through a nuclear micro-reactor system to a micro-grid, according to at least one aspect of the present disclosure.

In one aspect, the energy storage system is a battery storage system. In this aspect, the container houses individual battery cells that are arranged in multiple banks that include cell racks, interconnecting cabling, battery monitoring and energy management system, fire suppression system, HVAC, and security access equipment. In one aspect, the energy management system can be part of the autonomous control system 400 or part of the power electronics system controller 228 (FIG. 4). In an alternative aspect, the energy management system includes a control circuit. A method to detect a bad battery can be executed by a control circuit in the autonomous control system 400, in the power conversion system 200, e.g. power electronics system controller 228, or in the energy storage system 300. The method includes the control circuit monitoring a parameter indicative of the health of the battery cells in the battery storage system, e.g. charge/discharge rate, battery cell temperature, etc., and monitoring for adverse operating conditions. The method further includes the control circuit monitoring battery cell voltages, detecting a voltage imbalance, and adjusting battery cell charge rates appropriately to correct the voltage imbalance. The method further includes the control circuit detecting that the parameter is below a threshold. In at least one aspect, the parameter is charge/discharge rate and the method further includes the control circuit detecting that the charge/discharge rate of a battery cell is below a charge/discharge threshold. For example, the control circuit can monitor the discharge time of a battery cell and detect that the discharge time is below a threshold. In another example, the control circuit can detect that a battery cell is not charging properly. In an alternate aspect, the parameter is battery cell temperature and the method further includes the control circuit detecting that the battery cell temperature is above a temperature threshold. For example, the control circuit can monitor thermal conditions during charge and discharge and detect that the temperature of a battery cell is above a temperature threshold that could cause battery cell damage. The method further includes the control circuit transmitting a battery cell replacement message to a user interface, where the message informs the user of a battery cell that needs replaced. For example, the user interface could be a display screen, a guided user interface, a led light panel where each light is related to a battery cell health, and/or any device that informs a user that a battery needs replaced.

An example nuclear micro-reactor 100 is a thermal neutron spectrum reactor that delivers high temperature heat from the reactor core through passive heat pipes to a primary heat exchanger and onward to an open-air power conversion system. The nuclear micro-reactor 100 is contained within a canister containment system filled with an inert gas, e.g. helium, to protect reactor components from oxidation while enhancing heat transfer. The canister containment system also provides structural support for the nuclear micro-reactor 100. The design of the nuclear micro-reactor 100 allows for decay heat removal through a core block, a radial reflector, a canister containment system, and shielding. In one aspect, the nuclear micro-reactor 100 uses TRISO fuel and each core of fuel runs for at least eight years of full power operation. In this aspect, several layers of the TRISO fuel and the canister together represent the barriers that exist to preclude the release of fission products to the environment.

In at least one aspect, following approximately eight years of full power operation a freshly fueled nuclear micro-reactor 100 can be brought onsite and installed in an adjacent reactor container. The depleted reactor is then shut down and allowed to cool before transport for disposal while the new reactor is started up and connected to the infrastructure already in place. In at least one aspect, the spent fuel is not required to be stored onsite.

Figure 3:
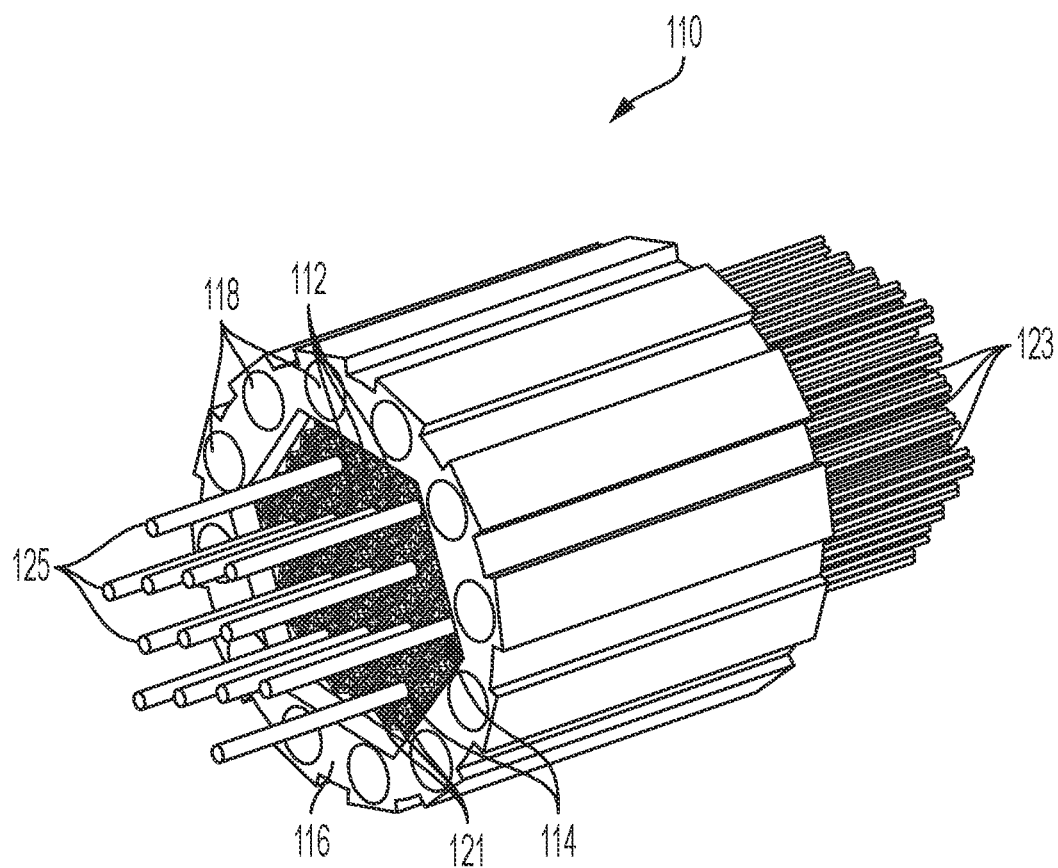
FIG. 3 is a perspective view of an example reactor core, according to at least one aspect of the present disclosure.

FIG. 3 is a perspective view of an example reactor core 110, according to at least one aspect of the present disclosure. In this example, the nuclear micro-reactor 100 uses heat pipes to transfer heat energy from the reactor core 110. The nuclear micro-reactor 100 is a transportable micro-reactor that is inherently simpler, smaller, and more reliable than previous reactors due to, at least, a solid state design. There are a limited number of moving parts within the reactor core 110 and minimal required maintenance between refueling. Decay heat is removed via natural convection and radiation heat transfer. The reactor core 110 design minimizes construction costs and labor because a micro-reactor facility can be installed and placed into operation in less than 30 days for a commercial application and the reactor operation is intended to be autonomous.

The reactor core 110 is enclosed within a canister filled with an inert gas, e.g. helium, to protect reactor components from oxidation while enhancing heat transfer. In at least one aspect, the reactor core 110 design includes of a monolithic graphite block with repeated, segmented, hexagonal unit cells 112, 114 oriented horizontally along the length of the reactor core 110. The unit cells 112, 114 can be of any geometrical shape. The example reactor core 110 shows hexagonally shaped unit cells 112, 114. The unit cells 112, 114 contain channels for fuel 121, heat pipes 123, e.g. alkali metal heat pipes, and shutdown rods 125. The reactor core 110 is surrounded by a thick radial reflector 116 which houses the control drums 118. In at least one aspect, the reactor core 110 alone, without the radial reflector 116, is subcritical, requiring the radial reflector 116 to achieve criticality. In at least one aspect, shielding is used to attenuate gamma and neutron radiation to protect site personnel and the public during operation and transportation.

In at least one aspect, reactivity control is accomplished using control drums 118 located on the periphery of the reactor core 110 and a burnable absorber incorporated into the matrix material of the fuel compacts. Reactivity can be monitored using the power range and source range neutron detectors. Shutdown can be achieved by two diverse and independent means: the reactivity control rods 125 and the control drums 118. In at least one aspect, additional shutdown rods 125 are used to address hypothetical accident conditions and maintain a sub-critical reactor during transportation.

Referring to FIG. 3, the reactor core 110 can be assembled to include fuel 121 (e.g. rods and/or stacks), heat pipes 123, and reactivity control rods 125 dispositioned throughout the plurality of unit cells 112 and reactivity control unit cells 114. Specifically, the fuel 121 can be dispositioned throughout fuel channels of one or more unit cells 112, the heat pipes 123 can be dispositioned throughout heat pipe channels of one or more unit cells 112, and the reactivity control rods 125 can be dispositioned through a reactivity control channel (not shown) of one or more reactivity control cells 114. According to some non-limiting aspects, the fuel 121 and heat pipes 123 are configured to extend the length of the reactor core 110. In other non-limiting aspects, the fuel 121 and heat pipes 123 are configured to extend an additional length beyond the length of the reactor core 110, to facilitate downstream ex-core connections and/or equipment (e.g. power conversion systems, condensers, structural supports). This design allows the reactor core 110 to be customized for any intended application and/or user preference, which enables it to be versatile in response to customer needs. The assembled reactor core 110 design of FIG. 3 allows the fuel 121 and heat pipes 123 to be specifically configured to accommodate for any specific power requirement and/or structural configuration without having to reinvent the basic reactor core 110 design and assume the inherent development risks.

In further reference to FIG. 3, the reflector 116 can further include a plurality of control drums 118 configured to house a neutron absorptive and reflective materials. In the event of a reactor and/or power failure, the control drums 118 can turn inward towards the reactor core 110 such that the absorptive material to shut down the reactor core 110 is turned inward. According to non-limiting aspect of FIG. 3, the reflector 116 can further include a gamma shield configured to substantially surround a neutron shield, the reactor core 110, and its internal components 112, 114, 121, 123, 125 to further mitigate radiation.

Still referring to FIG. 3, the reactor core 110 can further include a plurality of reactivity control rods 125 configured to be dispositioned through a reactivity control cell 114 of the plurality of reactivity control cells 114. For example, the reactivity control cells 114 can include a reactivity control rod 125 or reactivity control channel similar to the fuel channels and/or heat pipe channels, but specifically configured to accommodate a reactivity control rod 125. Each reactivity control rod 125 can include a neutron absorbing material configured to slow and/or stop the nuclear reactions within the reactor core 110 in the case of an emergency. The reactivity control rods 125 can collectively work to prevent the reactor core 110 from achieving a critical temperature or prompt criticality in the event of a reactor and/or power failure.

FIG. 4 is a diagram of an example energy flow through a nuclear micro-reactor system to a micro-grid 500, according to at least one aspect of the present disclosure. The nuclear micro-reactor 100 generates heat that is used by the induction generator 210 of the power conversion system 200 to generate electricity that is supplied to the power converter 222. The power converter 222 receives the electricity from the induction generator 210 on an induction side 224 of the power converter 222 and transmits energy to a power distribution system 230 on a grid side 226 of the power converter 222. The power converted 222 is coupled to an energy storage system 300 such that energy, e.g. electricity, can be stored in or supplied from the energy storage system 300. In at least one aspect, the energy storage system is a bank of battery cells that store electricity. In one aspect, the energy storage system 300 is connected to a link between the grid side 226 and induction side 224 of the power converter 222 in the power conversion system 200. This link allows the energy storage system 300 to provide or receive energy seamlessly, as described above in regard to FIGS. 1 and 2, while the autonomous control system 400 controls a power change in the nuclear micro-reactor 100. In at least one aspect, the link is a DC link.

The power distribution system 230 includes an output breaker 232 that supplies power to a micro-grid 500. In at least one aspect, the power distribution system 230 also supplies power to an AC transformer 240, where the AC transformer 240 supplies power to an AC distribution 242 and a house power converter 250. In one aspect, the house power converter 250 has a battery system 252 for energy storage. The house power converter 250 converts the AC power to DC power and supplies DC power to a DC distribution 260. In at least one aspect, the internal systems of the nuclear micro-reactor system are powered from the AC distribution 242 and DC distribution 260 depending on the type of power needed.

The autonomous control system 400 is connected to the micro-grid 500 through a micro-grid interface system 510. For example a power demand signal can be communicated from the micro-grid interface system 510 to the autonomous control system 400. In at least one aspect, the micro-grid interface system 510 is designed to communicate real and reactive power commands, e.g. frequency and/or voltage commands, to the autonomous control system 400 to meet the load, or power demand, requirements of the micro-grid 500. For example, the micro-grid interface system 510 can establish connection and disconnection of loads to maintain continuous power supply to customer loads. In at least one aspect, the micro-grid interface system 510 design has the flexibility to connect to a utility grid, if present, or operate in island mode and manage the micro-grid 500 if no utility connection exists. For example, island mode can have the entire system disconnected from any utility grid and the power conversion system 200 and energy storage system 300 supply any needed power to the micro-grid 500.

In at least one aspect, the autonomous control system 400 is coupled to the micro-grid interface system 510, a power electronics system controller 228 of the power conversion system 200, the house power converter 250, the energy storage system 300, and the micro-reactor 100. In one aspect, the power electronics system controller 228 is designed to regulate the output of the power conversion system 200 to meet the requirements of the power demand from the micro-grid 500. In at least one aspect, the power electronics system controller 228 is coupled to the energy storage system 300 and the power conversion system 200.

As described above, the autonomous control system 400 can receive a power demand signal from the micro-grid interface system 510. In at least one aspect, the autonomous control system 400 transmits the power demand to the power electronics system controller 228. In at least one aspect, the power electronics system controller 228 communicates with the energy storage system 300 to receive or transmit energy to the energy storage system to meet the new power demand.

In one aspect, in response to an increase in the power demand, the power electronics system controller 228 increases air flow over the heat pipes of the micro-reactor 100 to remove more heat from the reactor core of the nuclear micro-reactor 100. This process inserts positive reactivity in the reactor core and raises the core thermal output allowing the power conversion system 200 to produce more energy to meet the increased demand. In an alternative aspect, in response to an increase in the power demand, the autonomous control system 400 transmits a command to rotate the control drums in order to insert positive reactivity into the reactor core to increase the core temperature, which can lead to increasing the core thermal output.

In one aspect, in response to a power demand decrease, the power electronics system controller 228 decreases air flow over the heat pipes of the micro-reactor 100 to remove less heat from the reactor core of the nuclear micro-reactor 100. This will insert negative reactivity in the reactor core and lower core thermal output allowing the power conversion system 200 to produce less energy to meet the lowered demand. In an alternative aspect, in response to a power demand decrease, the autonomous control system 400 transmits a command to rotate the control drums in order to insert negative reactivity into the reactor core to decrease the core temperature, which can lead to decreasing the core thermal output.

Figure 5:
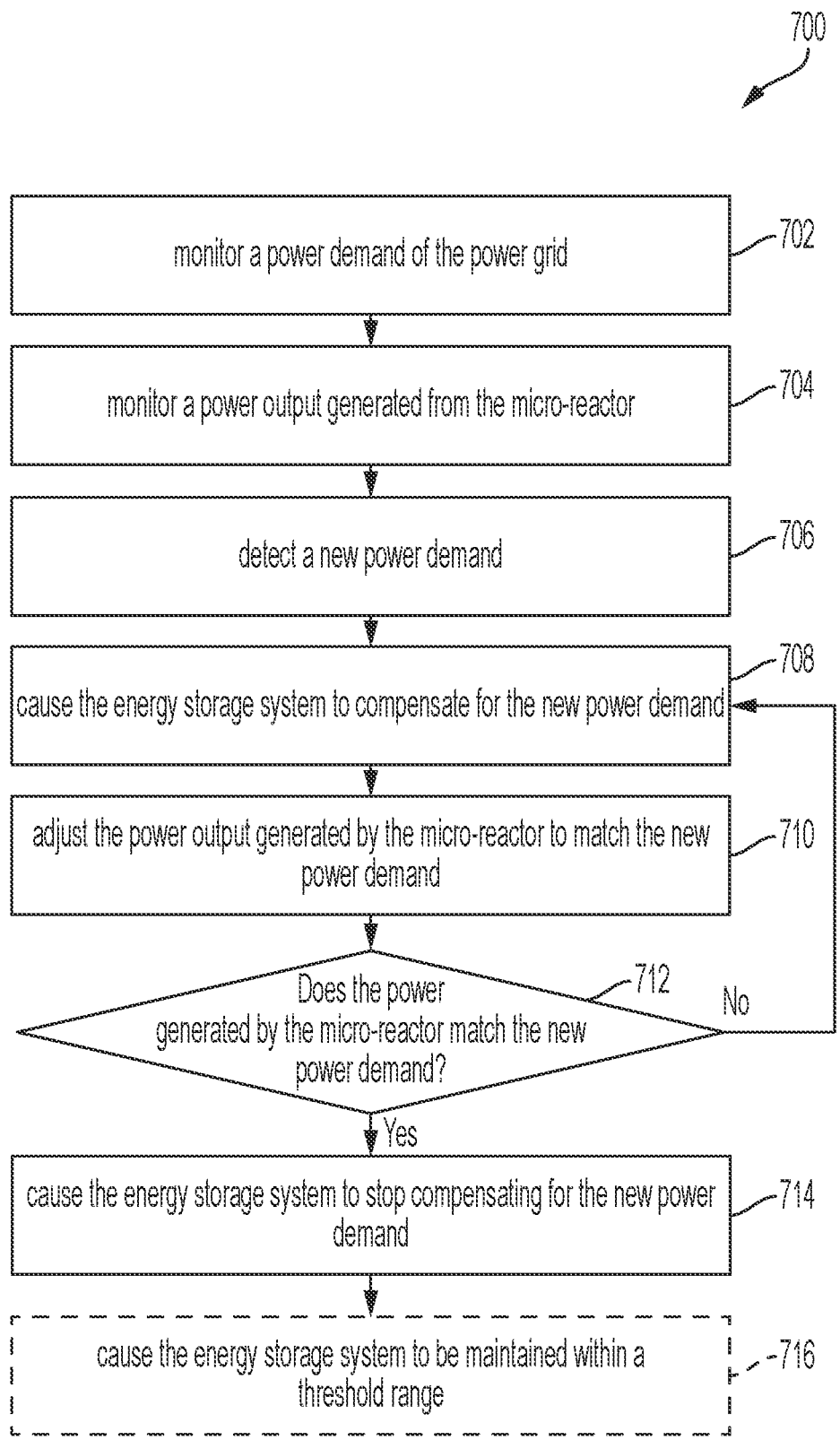
FIG. 5 illustrates a method that can be executed by a control circuit to control the power generated from a nuclear micro-reactor and supplied to a power grid, according to at least one aspect of the present disclosure.

FIG. 5 illustrates a method 700 that can be executed by a control circuit, e.g. a control circuit of the autonomous control system 400, to control the power generated from a nuclear micro-reactor, e.g. nuclear micro-reactor 100, and supplied to a power grid, e.g. micro-grid 500, according to at least one aspect of the present disclosure. The method 700 includes the control circuit monitoring 702 a power demand of the power grid. The method 700 further includes the control circuit monitoring 704 a power output generated from the nuclear micro-reactor. The method 700 further includes the control circuit detecting 706 a new power demand from the power grid. For example, a user could have connected a new device to the power grid to increase the power demand or the user could have disconnected a device from the power grid to decrease the power demand. The method 700 further includes the control circuit causing 708 the energy storage system, e.g. energy storage system 300, to compensate for the new power demand, as discussed above in regard to FIGS. 1 and 2. The method 700 further includes the control circuit adjusting the power output generated by the nuclear micro-reactor to match the new power demand, which is not instantaneous as described in regard to FIG. 2. As discussed above in regard to FIG. 4, the nuclear micro-reactor can have positive reactivity or negative reactivity introduced into the nuclear reactor core to increase or decrease the thermal output of the nuclear micro-reactor as desired. The method 700 further includes the control circuit determining 712 if the power generated from the nuclear micro-reactor matches the new power demand. If the power generated by the nuclear micro-reactor does not match the new power demand, then the method 700 proceeds along the "no" branch back to the control circuit causing 708 the energy storage system to compensate for the new power demand. If the power generated by the nuclear micro-reactor matches the new power demand, then the method 700 proceeds along the "yes" to the control circuit causing 714 the energy storage system to stop compensating for the new power demand. The method 700 further includes optionally the control circuit causing 716 the energy storage system to be maintained within a threshold range, as discussed above in regard to FIGS. 1 and 2.

EXAMPLES

Various aspects of the subject matter described herein are set out in the following numbered examples.

Example 1—A nuclear reactor system for use with a power grid. The nuclear reactor system comprising a nuclear reactor, an energy storage system coupled to the nuclear reactor, and a control circuit coupled to the nuclear reactor and the energy storage system. The control circuit is configured to: monitor a power demand of the power grid, monitor a power output generated from the nuclear reactor, detect a change in the power demand, cause the energy storage system to temporarily compensate for the change in the power demand, and adjust the power output based on the change in the power demand.

Example 2—The nuclear reactor of Example 1, wherein the change in the power demand is an increase in the power demand beyond the power output generated from the nuclear reactor. The control circuit is further configured to detect the increase in the power demand, cause the energy storage system to supply additional power output to meet the increase in the power demand, and adjust the power output based on the change in the power demand.

Example 3—The nuclear reactor of Example 1, wherein the change in the power demand is a decrease in the power demand below the power output generated from the nuclear reactor. The control circuit is further configured to detect the decrease in the power demand, cause the energy storage system to store excess power output resulting from the decrease in the power demand, and adjust the power output based on the change in the power demand.

Example 4—The nuclear reactor system of Examples 1, 2, or 3, wherein the energy storage system is maintained within a threshold range centered around 50% of the storage capacity.

Example 5—The nuclear reactor system of Example 4, wherein the control circuit is further configured to monitor a utilized storage capacity of the energy storage system, detect that the utilized storage capacity is less than a lower end of the threshold range, and increase the power output generated by the nuclear reactor in response to detecting the utilized storage capacity being below the lower end of the threshold range, wherein the increased power output creates excess energy above the power demand of the power grid. The control circuit is further configured to increase the utilized storage capacity of the energy storage system with the excess energy, and decrease the power output generated by the nuclear reactor to match the power demand upon the utilized storage capacity being above the lower end of the threshold range.

Example 6—The nuclear reactor system of Example 4, wherein the control circuit is further configured to: monitor a utilized storage capacity of the energy storage system, detect that the utilized storage capacity is greater than an upper end of the threshold range, and decrease the power output generated by the nuclear reactor in response to detecting the utilized storage capacity being above the threshold, wherein the decreased power output is below the power demand of the power grid. The control circuit is further configured to supply power from the energy storage system to compensate for the decrease in the power output, and increase the power output generated by the nuclear reactor to match the power demand upon the utilized storage capacity being below the upper end of the threshold range.

Example 7—The nuclear reactor of Examples 1, 2, 3, 4, 5, or 6, wherein the energy storage system has an energy storage capacity of 3.5 MWh.

Example 8—The nuclear reactor of Examples 1, 2, 3, 4, 5, 6, or 7, wherein the energy storage system comprises a mechanical energy storage system.

Example 9—The nuclear reactor of Examples 1, 2, 3, 4, 5, 6, or 7, wherein the energy storage system comprises a thermal energy storage system.

Example 10—The nuclear reactor of Examples 1, 2, 3, 4, 5, 6, or 7, wherein the energy storage system comprises a battery storage system comprising a plurality of battery cells.

Example 11—The nuclear reactor of Example 10, wherein the control circuit is configured to: monitor a parameter indicative of health of a battery cell in the plurality of battery cells, detect that the parameter is below a predetermined threshold, and transmit a battery cell replacement message for the battery cell to be replaced.

Example 12—A method of performing load following of a power grid with a nuclear reactor system. The method comprising monitoring a power demand of the power grid, monitoring a power output generated from a nuclear reactor, detecting a change in the power demand, causing an energy storage system to temporarily compensate for the new power demand, and adjusting the power output based on the change in the power demand.

Example 13—The method of Example 12, wherein the change in the power demand is an increase in the power demand beyond the power output generated from the nuclear reactor. The method further comprises detecting the increase in the power demand, causing the energy storage system to supply additional power output to meet the increase in the power demand, and adjusting the power output based on the change in the power demand.

Example 14—The method of Example 12, wherein the change in the power demand is a decrease in the power demand below the power output generated from the nuclear reactor. The method further comprises: detecting the decrease in the power demand, causing the energy storage system to store the excess power resulting from the decrease in the power demand, and adjusting the power output based on the change in the power demand.

Example 15—The method of Examples 12, 13, or 14, wherein the energy storage system is maintained within a threshold range centered around 50% of the storage capacity.

Example 16—The method of Examples 12, 13, 14, or 15, wherein the method further comprises monitoring a utilized storage capacity of the energy storage system, detecting that the utilized storage capacity is less than a lower end of the threshold range, and increasing the power output generated by the nuclear reactor in response to detecting the utilized storage capacity being below the lower end of the threshold range, wherein the increased power output creates excess energy above the power demand of the power grid. The method further comprises increasing the utilized storage capacity of the energy storage system with the excess energy, and decreasing the power output generated by the nuclear reactor to match the power demand upon the utilized storage capacity being above the lower end of the threshold range.

Example 17—The method of Examples 12, 13, 14, or 15, wherein the method further comprises: monitoring a utilized storage capacity of the energy storage system, detecting that the utilized storage capacity is greater than an upper end of the threshold range, and decreasing the power output generated by the nuclear reactor in response to detecting the utilized storage capacity being above the upper end of the threshold range, wherein the decreased power output is below the power demand of the power grid. The method further comprises suppling power from the energy storage system to compensate for the decrease in the power output, and increasing the power output generated by the nuclear reactor to match the power demand upon the utilized storage capacity being below the upper end of the threshold range.

Example 18—A nuclear reactor system for use with a power grid. The nuclear reactor system comprising a nuclear reactor and a power conversion system coupled to the nuclear reactor, wherein the power conversion system transforms a thermal output from the nuclear reactor into electricity. The nuclear reactor system further comprises an energy storage system coupled to the power conversion system and a control circuit coupled to the power conversion system, the nuclear reactor, and the energy storage system. The control circuit is configured to monitor a load on the power grid, monitor a power output generated by the nuclear reactor through the power conversion system and supplied to the power grid, and detect a new load on the power grid, wherein the new load is different than the power output. The control circuit is further configured to cause the energy storage system to temporarily compensate for the new load, and adjust the nuclear reactor to generate a new power output based on the new load.

Example 19—The nuclear reactor of Example 18, wherein the new load is an increased load. The control circuit is further configured to detect the increased load beyond the power output of the nuclear reactor, cause the energy storage system to supply additional power output to meet the increased load, and adjust the nuclear reactor to generate the new power output based on the increased load.

Example 20—The nuclear reactor of Example 18, wherein the new load is a decreased load. The control circuit is further configured to detect the decreased load below the power output of the nuclear reactor, cause the energy storage system to store the excess power resulting from the decreased load, and adjust the nuclear reactor to generate the new power output based on the decreased load.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications or combinations of any of the exemplary aspects may be made without departing from the scope of the disclosure. In addition, persons skilled in the art will recognize, or be able to ascertain using no more than routine experimentation, many equivalents to the various aspects of the present disclosure described herein upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those aspects where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those aspects where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all aspects by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A nuclear reactor system for use with a power grid, the nuclear reactor system comprising:
a nuclear reactor;
an energy storage system coupled to the nuclear reactor; and
a control circuit coupled to the nuclear reactor and the energy storage system, wherein the control circuit is configured to:
monitor a power demand of the power grid;
monitor a power output generated from the nuclear reactor;
detect a change in the power demand;
cause the energy storage system to temporarily compensate for the change in the power demand; and
adjust the power output based on the change in the power demand, wherein the energy storage system is maintained within a threshold range of a total storage capacity, and wherein the control circuit is further configured to:
monitor a utilized storage capacity of the energy storage system;
detect that the utilized storage capacity is less than a lower end of the threshold range;
increase the power output generated by the nuclear reactor in response to detecting the utilized storage capacity being below the lower end of the threshold range, wherein the increased power output creates excess energy above the power demand of the power grid;
increase the utilized storage capacity of the energy storage system with the excess energy; and
decrease the power output generated by the nuclear reactor to match the power demand upon the utilized storage capacity being above the lower end of the threshold range.

2. The nuclear reactor of claim 1, wherein the change in the power demand is an increase in the power demand beyond the power output generated from the nuclear reactor, and wherein the control circuit is further configured to:
detect the increase in the power demand;
cause the energy storage system to supply additional power output to meet the increase in the power demand; and
adjust the power output based on the change in the power demand.

3. The nuclear reactor system of claim 1, wherein the threshold range is centered around 50% of the total storage capacity.

4. The nuclear reactor of claim 1, wherein the energy storage system has an energy storage capacity of 3.5 MWh.

5. The nuclear reactor of claim 1, wherein the energy storage system comprises a mechanical energy storage system.

6. The nuclear reactor of claim 1, wherein the energy storage system comprises a thermal energy storage system.

7. The nuclear reactor of claim 1, wherein the energy storage system comprises a battery storage system comprising a plurality of battery cells.

8. The nuclear reactor of claim 7, wherein the control circuit is configured to:
monitor a parameter indicative of health of a battery cell in the plurality of battery cells;
detect that the parameter is below a predetermined threshold; and
transmit a battery cell replacement message for the battery cell to be replaced.

9. A nuclear reactor system for use with a power grid, the nuclear reactor system comprising:
a nuclear reactor;
an energy storage system coupled to the nuclear reactor; and
a control circuit coupled to the nuclear reactor and the energy storage system, wherein the control circuit is configured to:
monitor a power demand of the power grid;
monitor a power output generated from the nuclear reactor;
detect a change in the power demand;
cause the energy storage system to temporarily compensate for the change in the power demand; and
adjust the power output based on the change in the power demand, wherein the energy storage system is maintained within a threshold range of a total storage capacity, and wherein the control circuit is further configured to:
monitor a utilized storage capacity of the energy storage system;
detect that the utilized storage capacity is greater than an upper end of the threshold range;
decrease the power output generated by the nuclear reactor in response to detecting the utilized storage capacity being above the upper end of the threshold range, wherein the decreased power output is below the power demand of the power grid;
supply power from the energy storage system to compensate for the decrease in the power output; and
increase the power output generated by the nuclear reactor to match the power demand upon the utilized storage capacity being below the upper end of the threshold range.

10. The nuclear reactor of claim 9, wherein the change in the power demand is a decrease in the power demand below the power output generated from the nuclear reactor, and wherein the control circuit is further configured to:
detect the decrease in the power demand;
cause the energy storage system to store excess power output resulting from the decrease in the power demand; and
adjust the power output based on the change in the power demand.

11. The nuclear reactor system of claim 9, wherein the threshold range is centered around 50% of the total storage capacity.

12. A method of performing load following of a power grid with a nuclear reactor system, the method comprising:
monitoring a power demand of the power grid;
monitoring a power output generated from a nuclear reactor;
detecting a change in the power demand;
causing an energy storage system to temporarily compensate for the change in the power demand; and
adjusting the power output based on the change in the power demand, wherein the energy storage system is maintained within a threshold range of a total storage capacity, and wherein the method further comprises:
monitoring a utilized storage capacity of the energy storage system;
detecting that the utilized storage capacity is less than a lower end of the threshold range;
increasing the power output generated by the nuclear reactor in response to detecting the utilized storage capacity being below the lower end of the threshold range, wherein the increased power output creates excess energy above the power demand of the power grid;

increasing the utilized storage capacity of the energy storage system with the excess energy; and decreasing the power output generated by the nuclear reactor to meet the power demand upon the utilized storage capacity being above the lower end of the threshold range.

13. The method of claim 12, wherein the change in the power demand is an increase in the power demand beyond the power output generated from the nuclear reactor, and wherein the method further comprises:

detecting the increase in the power demand;

causing the energy storage system to supply additional power output to meet the increase in the power demand; and adjusting the power output based on the change in the power demand.

14. The method of claim 12, wherein the threshold range is centered around 50% of the total storage capacity.

15. A method of performing load following of a power grid with a nuclear reactor system, the method comprising:

monitoring a power demand of the power grid;

monitoring a power output generated from a nuclear reactor;

detecting a change in the power demand;

causing an energy storage system to temporarily compensate for the change in the power demand; and adjusting the power output based on the change in the power demand, wherein the energy storage system is maintained within a threshold range of a total storage capacity, and wherein the method further comprises:

monitoring a utilized storage capacity of the energy storage system;

detecting that the utilized storage capacity is greater than an upper end of the threshold range;

decreasing the power output generated by the nuclear reactor in response to detecting the utilized storage capacity being above the upper end of the threshold range, wherein the decreased power output is below the power demand of the power grid;

suppling power from the energy storage system to compensate for the decrease in the power output; and increasing the power output generated by the nuclear reactor to meet the power demand upon the utilized storage capacity being below the upper end of the threshold range.

16. The method of claim 15, wherein the change in the power demand is a decrease in the power demand below the power output generated from the nuclear reactor, and wherein the method further comprises:

detecting the decrease in the power demand;

causing the energy storage system to store excess power resulting from the decrease in the power demand; and adjusting the power output based on the change in the power demand.

17. The method of claim 15, wherein the threshold range is centered around 50% of the total storage capacity.

* * * * *